United States Patent Office 3,440,202
Patented Apr. 22, 1969

3,440,202
POLYMER SOLUTIONS AND METHODS FOR PREPARING AND USING THE SAME
Edith M. Boldebuck, Schenectady, and Richard F. Gaertner, Rexford, N.Y., assignors to General Electric Company, a corporation of New York
No Drawing. Filed May 5, 1966, Ser. No. 547,724
Int. Cl. C08g 20/32, 51/34
U.S. Cl. 260—31.2                  17 Claims

ABSTRACT OF THE DISCLOSURE

Polyamide acid solutions having lower viscosities are unexpectedly produced at temperatures below 40° C. in a solvent consisting of cresol or cresol-phenol mixtures by dissolving a mixture of at least one benzophenone dianhydride and at least one diamine in the solvent and additives such as an ammonium salt of a monocarboxylic acid or a strong organic acid, and allowing the reactants to interact. These polyamide acid solutions are useful as coatings for wires, in making capacitor dielectrics, etc.

---

This invention relates to synthetic polymer compositions and methods for preparing such materials. More particularly, the invention is concerned with a process for making a polyamide acid solution which comprises (1) dissolving a mixture of ingredients comprising (a) at least one benzophenone dianhydride (e.g., 2,2′,3,3′-, 2,3,3′,4′-, 3,3′,4,4′-benzophenone tetracarboxylic acid dianhydride), (b) at least one diamine selected from the group consisting of m-phenylenediamine, and diamines having the formula

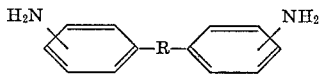

where R is a divalent radical selected from the group consisting of $C_{1-3}$ alkylene,

—O— and

and (c) an additive selected from the group consisting of (i) an ammonium salt of an aliphatic saturated monocarboxylic acid having from one to five carbon atoms, (ii) an ammonium salt of an aromatic monocarboxylic acid, and (iii) a strong organic acid, in an anhydrous solvent selected from the group consisting of cresol and cresol-phenol mixtures, and (2) allowing the reactants to interact at a temperature below 40° C., e.g., from 20° C. to ambient temperatures, such as 25 to 30° C., to form the polyamide acid substantially free of any polyimide groups derived from the polyamide acid.

U.S. Patent 3,179,614, issued Apr. 29, 1965, describes a class of resins comprising polyamide acid resins which are generally prepared by the reaction of a dianhydride of a tetracarboxylic acid with various diamines. The most widely used dianhydride is pyromellitic dianhydride, although this patent does describe a number of other dianhydrides. In accordance with this patent, the dianhydride and the diamine are reacted in the presence of a number of recited organic solvents for both the reactants and the intermediate polymeric acid amide. Additionally, this patent recites the need for employing solvents for the reaction which are relatively expensive and not readily available.

If cresol is used as the solvent in the preparation of a polyamide acid from a dianhydride such as benzophenone dianhydride and a diamine, the mixture must be heated to an elevated temperature of, for example, 100 to 160° C. to react the diandydride and diamine since the reaction products are not soluble in this solvent at room temperature. It would be desirable to form such a polyamide acid in a cresol solvent if the polymer remainder soluble at room temperature and exhibited a low solution viscosity to permit the use of the solution for coating purposes. After shaping or coating a substrate the polyamide acid would be readily converted to the polyamide form by chemical or thermal means to produce products having excellent solvent resistance and resistance to flow at elevated temperatures.

Unexpectedly it has been discovered that it is possible to prepare such soluble polyamide acid resins in anhydrous solvents of the various cresols, e.g., ortho-, meta- and para-cresol, and cresol-phenol mixtures without the necessity of using heat, which exhibit low solution viscosity and are substantially free of any polyimide groups. Commercially available cresol from coal tar is a mixture of isomers which is liquid at room temperature and is an ideal solvent for our process. The range for the cresol-phenol mixtures can be varied widely up to about 75% phenol in such mixtures. What is equally significant, it is possible to use such a relatively inexpensive solvent to make the polyamide acid resin in solution and to carry out the reaction at room temperature rapidly by the addition of the above additive. The solubility and low solution viscosity of the additive system polymer results in improved ability to impregnate porous materials, easier coating of wires by means of dies, etc., at high solids content.

The above results were entirely unexpected and in no way could have been predicted because it had been believed that a carefully controlled heating cycle with the cresol solvent system must be observed in making the polyamide acid resin since the resin is insoluble in such a solvent at room temperature.

We have unexpectedly discovered that the polyamide acid remains soluble in a cresol or cresol-phenol solvent even at room temperature and has a low solution viscosity if we incorporate in the solvent as the additive an ammonium salt of an aliphatic monocarboxylic acid having from one to five carbon atoms of the formula

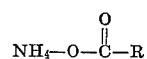

where R is a monovalent hydrocarbon radical, such as ammonium formate, ammonium acetate, ammonium propionate, ammonium butyrate, amonium valerate, etc., or an ammonium salt of an armotic monocarboxylic acid such as ammonium benzoate, or ammonium toluate. Such an additive may also be incorporated by its preparation as an integral part of the process or by the addition of its components parts in the solvent.

We have found also unexpectedly that similar beneficial results are attained when we incorporate in the solvent as the additive a strong organic acid which is soluble in the solvent and has a dissociation constant of at least $5\times10^{-2}$ as measured in an aqueous system, such as methane sulfonic acid, trichloroacetic acid, etc. For example, we have found that by adding from 0.5 to 2.5 moles of such an ammonium salt or strong organic acid to one mole of the dianhydride we are able to increase the miscibility of the formed polyamide acid with the cresol or cresol-phenol solvent thereby obtaining a homogenous clear solution without deleteriously affecting the ability to use such solutions for the purposes intended.

It is also important that one employ benzophenone dianhydride with the diamine in order to obtain the above-described desired end results. If one employs instead of these dianhydrides, pyromellitic dianhydride (which is the preferred dianhydride in the above-mentioned U.S. Patent 3,179,614) with the above additive in a cresol or cresol-phenol solvent, the reactants are either not soluble in the aforesaid mixture and precipitate, or the reaction product does not provide a desirable coating solution.

In carrying out the reaction it is preferable to add the diamine to the dianhydride and additive dissolved in the cresol or cresol-phenol solvent and allow the mixture to remain advantageously with stirring at ambient temperatures employing cooling if necessary to maintain the temperature of the mixture below 40° C. to avoid polyimide formation. The use of a continuous process for making these polyamide acids is especially served by the use of the additive in the solvent to take advantage of the solubility of the reactants and intermediate polyamide acid in the solvent and the low cost of the solvent.

Various diamines have been found useful for reacting with the above-described dianhydrides. Of the various diaminobenzenes, m-phenylenediamine will give polymers with the carbonyl-diphthalic anhydrides which are soluble in the phenolic solvents. Of the various binuclear diamines in which one amino group is on each of the phenyl groups and the phenyl groups are separated by an alkylene, carbonyl, oxygen or sulfonyl radical will give polymeric products with the dianhydrides which are soluble in the phenolic solvent. Typical examples of such diamines are the various isomeric ortho-, meta- and para-oxydianilines, e.g., 2,2'-oxydianiline, 3,3'-oxydianiline, 4,4'-oxydianiline, 2,3'-oxydianiline, 2,4'-oxydianiline, 3,4'-oxydianiline, etc., the alkylenedianilines, especially those in which the alkylene group has from one to three carbon atoms, e.g., methylenedianiline, ethylenedianiline, ethylenedianiline, propylidenedianiline, propylenedianiline, etc., including the various ortho-, meta- and para-isomers thereof, the various ortho-, meta- and para-isomers of diaminobenzophenone, and the various ortho-, meta- and para-isomers of sulfonyldianiline. Of these diamines, m-phenylenediamine (m-PDA), 4,4'-oxydianiline (ODA), 4,4'-methylenedianiline (MDA), and 4,4'-sulfonyldianiline are the most readily available.

The initial temperature, before the addition of the diamine, should be about or below room temperature. After the addition of the diamine, the temperature usually rises 10 to 15 degrees, due to the fact that the reaction is exothermic. At these temperatures the addition reaction to form the polyamide acid is usually complete at the end of about 30 minutes to one hour, as is shown by the increase in the viscosity of the reaction mixture. The cyclization reaction to form the polymeric imides proceeds advantageously at a temperature of about 125° to 300° C. to form a clear flexible film when cast on a glass substrate. In applying coatings or depositing films from solution, the temperatures used to remove the solvent should be raised gradually to obtain smooth coatings and films.

Of the various dianhydrides, the most readily available and preferred dianhydride is 3,3',4,4'-benzophenone tetracarboxylic acid dianhydride. These anhydrides may be made in the manner described in U.S. 3,078,279, McCracken et al.

In forming the polymeric products it is only required to mix one or more of the dianhydrides with one or more of the above named amines and with one of the above named additives in the presence of liquid cresol or cresol-phenol solvent; they go into solution rapidly and appear to react in a short period of time to produce a polymeric amide acid solution which remains liquid and homogenous at room temperature. This polymer usually has an intrinsic viscosity of 0.18 to 0.30 at room temperature when measured in the solvent used for making the polyamide acid. If desired, an inert atmosphere, e.g., nitrogen, can be used in the reaction vessel to retard oxidation of the amines to produce lighter colored polymers. Monoamines such as aniline, p-biphenylamine, benzylamine, or anhydrides of a dicarboxylic acid, such as phthalic anhydride or maleic anhydride, or other reagents reactive with amines or carboxylic acids may be used to chain-stop or modify the polymers. These may be added at the start, during, or at the end of the polymer-forming reaction and may be used to react with any slight excess of either the diamine or dianhydride used initially.

The amount of solvent used should be sufficient to produce a homogenous solution with the reactants and polyamide acid polymer, and yet not be too viscous so as to introduce handling problems. If too much solvent is used, the cost advantage over other more expensive solvents is reduced. Optimum concentrations are in the range of 5 to 40 percent, by weight, polymer and 60 to 95 percent, by weight, solvent mixture, based on the end-use.

In order that those skilled in the art may better understand how the invention may be practiced, the following examples are given by way of illustration and not by way of limitation. All percentages are by weight, unless otherwise stated. Anhydrous conditions were maintained at all times.

EXAMPLE 1

In this example, .733 gram of reagent grade ammonium acetate, the additive, was weighed into a dry flask and 9.352 grams of 17.0 weight percent benzophenone dianhydride (BPDA) solution in dry cresol was added. The mixture was warmed slightly to hasten solution of the salt, and was then cooled to room temperature. 5.909 grams of 16.7 weight methylenedianiline (MDA) in cresol was added to the mixture and the mixture was stirred with a magnetic stirrer in the stoppered flask in the presence of anhydrous nitrogen atmosphere. No precipitate of any kind was observed. The exothermic temperature rise was controlled to keep it below about 40° C. during a one-hour period, yielding a clear, viscous, pale yellow polyamide acid solution substantially free of polyimide groups. A sample of this solution was cast on a glass substrate and heated for two minutes at 250° C. to yield a tough, flexible, insoluble polyimide film.

EXAMPLES 2–9

In these examples, the same procedure as in Example 1 was followed to form solutions of polyamide acids. Again, care was exercised to counteract the exotherm of the reaction and to keep the temperature as close to room temperature (about 23–28° C.) as possible. Example 8 employed pyromellitic dianhydride (PMDA) in place of BPDA and illustrates the difficulty in using the PMDA in place of the BPDA in the phenolic-additive solvent as evidenced by the fact that the intermediate polyamide acid reaction product precipitated, thereby producing no effective solubilization at room temperature. The following Table 1 shows the ingredients and proportions of ingredients used, and the kind of film which was derived by casting the intermediate resin solution on a glass substrate for about two minutes at a temperature of 250° C. to volatilize the solvent and to form the polyimide final product. Examples 2, 6, 7 and 8 employ metaphenylene diamine (m-PDA). Examples 3 and 4 employ methylenedianiline (MDA), while Examples 5 and 9 employ oxydianiline (ODA). It will be noted that the film formed in Example 6 was tough and insoluble but not as flexible as compared with the film of Examples 2–5. In Example 7, a clear solution was obtained but no film was cast subsequently on a glass substrate. In Example 9, the solvent was a mixture of 65% phenol and 35% cresol, while cresol was employed in Example 1–8.

TABLE 1

| Ex. | A Additive | B D anhydride | C Diamine | Mole ratio A/B/C |
|---|---|---|---|---|
| 2 | Ammonium benzoate | BPDA | m-PDA | 2/1/1.03 |
| 3 | do | BPDA | MDA | 2/1/1.03 |
| 4 | Ammonium acetate | BPDA | MDA | 1.9/1/1.01 |
| 5 | do | BPDA | ODA | 1.5/1/1.05 |
| 6 | Ammonium formate | BPDA | m-PDA | 2/1/1.03 |
| 7 | Ammonium valerate | BPDA | m-PDA | 1.5/1/1./5 |
| 8 | Ammonium benzoate | PMDA | m-PDA | 1.5/1/1.03 |
| 9 | do | BPDA | ODA | 1/1/1.04 |

| Example | Wt. percent of polymer in salt-free solution | Effective solubilization at room temp. | Cured film |
|---|---|---|---|
| 2 | 20.0 | Yes | Flexible. |
| 3 | 17.0 | Yes | Do. |
| 4 | 16.9 | Yes | Do. |
| 5 | 16.9 | Yes | Do. |
| 6 | 20.0 | Yes | Not flexible. |
| 7 | 20.0 | Yes | No film cast. |
| 8 | 20.0 | No | |
| 9 | 20.0 | Yes | Flexible. |

EXAMPLE 10

In this example, 0.365 gram of solid ammonium benzoate, the additive, was added to a solution of 10.138 grams of 17 weight percent BPDA in cresol. The mixture was warmed slightly to dissolve the salt and a cresol solution of 6.368 grams of 16.7 weight percent MDA was added. The mixture was stirred well and allowed to stand at room temperature. Mole ratios of ingredients at this stage were salt/BPDA/MDA=.49/1.0/1.01. After two hours no precipitate had formed, but at the end of 16 hours the entire mass was a waxy solid. An additional 0.16 gram of 16.7 weight percent MDA in cresol was added to adjust the monomer stoichiometry to 3% excess diamine, and a further 0.38 gram of solid ammonium benzoate was weighed into the flask to adjust the mole ratio of salt/BPDA to 1/1. The solid ammonium benzoate lying on the surface of the waxy material began to solubilize the underlying paste and after about half an hour the entire mass had become a homogenous, moderately viscous solution. A sample of this solution was cast on a glass substrate and heated for two minutes at 250° C. to yield a tough, flexible, insoluble polyimide film.

EXAMPLES 11–13

In these examples, polyamide acid solutions were made according to the procedure in Example 1, but with m-PDA as the diamine and ammonium benzoate as the additive. Amounts of material, their mole ratios, and solution viscosities after storage of the solutions for several days at room temperature are given in Table 2.

TABLE 2

| Example | A Ammonium Benzoate (g.) | B BPDA (g.) | C m-PDA (g.) |
|---|---|---|---|
| 11 | 0.831 | 1.863 | .642 |
| 12 | 1.274 | 1.958 | .676 |
| 13 | 1.689 | 1.970 | .676 |

| Example | Cresol (g.) | Mole ratio A/B/C | Solution viscosity at 25° C. (centistokes) |
|---|---|---|---|
| 11 | 10.02 | 1/1/1.03 | 12,850 |
| 12 | 10.53 | 1.51/1/1.03 | 1,256 |
| 13 | 10.58 | 1.99/1/1.023 | 618 |

After standing at room temperature for three days, no precipitate of any kind had formed in any of the solutions. All three solutions gave tough, flexible, insoluble films when cured two minutes at 250° C.

EXAMPLE 14

In this example, 4.8853 grams of reagent grade benzoic acid was added to a 10 ml. flask. Dry ammonia gas was then sparged through the benzoic acid resulting in an exothermic reaction forming ammonium benzoate. After about 15 minutes of sparging with ammonia the flask began to cool. At this point the flask was weighed, and the contents were found to have increased in weight to 5.5390 grams, indicating that the reaction to form ammonium benzoate had gone to 99.5 percent of completion. To the flask was then added 6.444 grams of BPDA and about 20 grams of dry cresol that previously had been distilled. The contents of the flask were gently heated with stirring until a clear, pale yellow solution was formed. After the flask had cooled to room temperature 2.2268 grams of m-PDA dissolved in dry cresol was added to form a clear slightly viscous solution of polyacid amide. The total weight of cresol in this final solution was 34.7 grams. The mole ratio of additive/dianhydride/diamine was 2/1/1.03. A glass substrate coated with the solution and heated to 250° C. for four minutes produced a clear flexible polyimide film.

EXAMPLES 15–18

In Examples 15–17, the dianhydride and the diamine were added to separate cresol solvents and allowed to cool to room temperature. In Examples 15 and 16 the additive, a strong organic acid as described above, was added to the dianhydride solution, while in Example 17 the control agent was added to the diamine solution. The diamine solution was then added to the dianhydride solution. In Example 15, an anhydrous nitrogen atmosphere was also employed. A sample of each solution was cast on a glass substrate and heated for two minutes at 250° C. to yield a tough, flexible, insoluble polyimide film. In Example 18, the solvent mixture had a composition of 65% phenol and 35% cresol. A sample of the solution from Example 18 was cast on a glass substrate and heated for four minutes at 250° C. to yield a tough, flexible, insoluble polyimide film. Table 3 sets forth the materials and their mole ratios.

TABLE 3

| Ex. | A Additive | B Dianhydride | C Diamine | Mole ratio A/B/C |
|---|---|---|---|---|
| 15 | Methane sulfonic acid | BPDA | m-PDA | 2/1/1.08 |
| 16 | Trichloroacetic acid | BPDA | m PDA | 2.5/1/1.02 |
| 17 | do | BPDA | m-PDA | 2.5/1/1.02 |
| 18 | do | BPDA | ODA | 2.09/1/1.04 |

| Example | Wt. percent solids w/o additives | Effective solubilization at room temperature | Cured film |
|---|---|---|---|
| 15 | 20 | Yes | Flexible. |
| 16 | 20 | Yes | Do. |
| 17 | 20 | Yes | Do. |
| 18 | 20 | Yes | Do. |

Although the utility of the polymer solutions of the present invention have been described in the above-mentioned patents principally in terms of applications as flexible films, it should be understood that these polymers may be used in other applications suitable for such compositions. Thus, these polyamide acid resins can be converted to polyimides and employed as insulation over a conducting core. Additionally, these polyimides can be employed over a conducting core, previously coated with another polymer, or vice versa, to give laminated, insulated coatings on the wire to improve the properties of the insulation. They may also be used as dipping varnishes to impregnate coils of previously insulated wire, i.e., in the motor and generator rotors, field coils, etc. These resins may also be used in molding powder formulations by mixing with various fillers, for example, wood flour, diatomaceous earth, carbons, silica, abrasive grains, e.g., carborundum, diamond grit, etc. These polymers are also useful in preparing fibers, as impregnants, and bonding materials for metallic and fibrous laminates, etc. The polymers in film form are suitable as a dielectric in making capacitors, as slot insulation in motors, etc.

It has been found that in accordance with the process herein described that it is possible to synthesize completely aromatic polyamide acids in inexpensive phenolic-additive systems without resorting to any heating. This simple direct process allows the preparation of coating solutions that are easily prepared, and in which the viscosity of the solvent can be readily adjusted at will for control by variation in the amount of the additive and thereby permit greater flexibility on application to glass and metal surfaces. Since substantially no heating is required, very simple mixing techniques may be applied to produce a polymer solution useful for bonding glass fibers, for making laminations and for coating metal substrates for use as thermal and electrical insulating films.

It will of course be apparent to those skilled in the art that other benzophenone dianhydrides and other diamines may be employed in place of those recited in the foregoing examples, many illustrations of these reactants being given previously, without departing from the scope of the invention. The ratio of reactants as well as the proportions of the solvent and additive may also be varied within the ranges recited above. It is also to be understood that the conditions of reaction, formation of intermediate polyamide acid, and of the ultimate polyimide product can also be varied widely in accordance with the intended invention. The incorporation of other additives, such as light stabilizers, oxidation inhibitors, levelling additives, etc., is not precluded.

What we claim as new and desire to secure by Letters Patent of the United States is:

1. The process for making a polyamide acid solution which comprises (1) dissolving a mixture of ingredients comprising (a) at least one benzophenone dianhydride, (b) at least one diamine selected from the group consisting of m-phenylenediamine and diamines having the formula

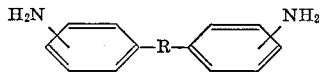

where R is a divalent radical selected from the group consisting of $C_{1-3}$ alkylene,

—O— and

and (c) for each mole of said anhydride, from 0.5 to 2.5 moles of an additive selected from the group consisting of (i) an ammonium salt of an aliphatic saturated monocarboxylic acid having from one to five carbon atoms and the ammonium salt of benzoic acid in a solvent selected from the group consisting of cresol and cresol-phenol mixtures, and (2) allowing the reactants to interact at a temperature below 40° C. to form the polyamide acid substantially free of any polyimide resin.

2. A process as in claim 1, wherein the diamine is m-phenylenediamine.

3. A process as in claim 1, wherein the diamine is 4,4'-methylenedianiline.

4. A process as in claim 1, wherein the diamine is 4,4'-oxydianiline.

5. A process as in claim 1, wherein the benzophenone dianhydride is 3,3',4,4'-benzophenone tetracarboxylic acid dianhydride.

6. A process as in claim 1, wherein the additive is ammonium acetate.

7. A process as in claim 1, wherein the additive is ammonium benzoate.

8. A polyamide acid solution comprising (1) the product of reaction of a mixture of ingredients comprising (a) at least one benzophenone dianhydride, and (b) at least one diamine selected from the group consisting of m-phenylenediamine, and diamines having the formula

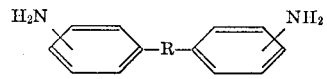

where R is a divalent radical selected from the group consisting of $C_{1-3}$ alkylene,

—O— and

and (2) an additive selected from the group consisting of (i) an ammonium salt of an aliphatic saturated monocarboxylic acid having one to five carbon atoms and the ammonium salt of benzoic acid and (3) a solvent selected from the group consisting of cresol and cresol-phenol mixtures.

9. A composition as in claim 8, in which the benzophenone dianhydride is 3,3',4,4'-benzophenone tetracarboxylic acid dianhydride.

10. A composition as in claim 8, in which the diamine is m-phenylenediamine.

11. A composition as in claim 8, wherein the diamine is 4,4'-methylenedianiline.

12. A composition as in claim 8, in which the diamine is 4,4'-oxydianiline.

13. A composition as in claim 8, in which the additive is ammonium acetate.

14. A composition as in claim 8, in which the additive is ammonium benzoate.

15. A composition as in claim 8, in which the benzophenone dianhydride is 3,3'-4,4'-benzophenone tetracarboxylic acid dianhydride and the diamine is m-phenylenediamine.

16. A composition as in claim 8, in which the benzophenone dianhydride is 3,3',4,4'-benzophenone tetracarboxylic acid dianhydride and the diamine is 4,4'-methylenedianiline.

17. A composition as in claim 8, in which the benzophenone dianhydride is 3,3',4,4'-benzophenone tetracarboxylic acid dianhydride and the diamine is 4,4'-oxydianiline.

References Cited

UNITED STATES PATENTS

| 3,190,856 | 6/1965 | Lavin et al. | 260—65 |
| 3,242,128 | 3/1966 | Chalmers | 260—65 |
| 3,277,043 | 10/1966 | Holub. | |

FOREIGN PATENTS

| 570,858 | 7/1945 | Great Britain. |

ALLAN LIEBERMAN, *Primary Examiner.*

U.S. Cl. X.R.

260—33.4, 30.8, 65